N. B. BRALY.
CANVAS HOSE COUPLING.
APPLICATION FILED AUG. 8, 1916.
1,211,067.
Patented Jan. 2, 1917.
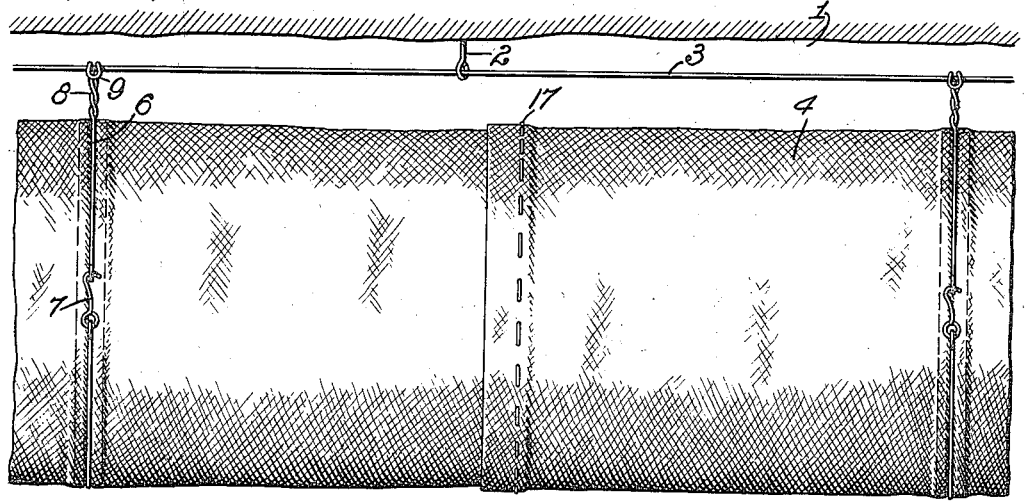
Fig. 1.
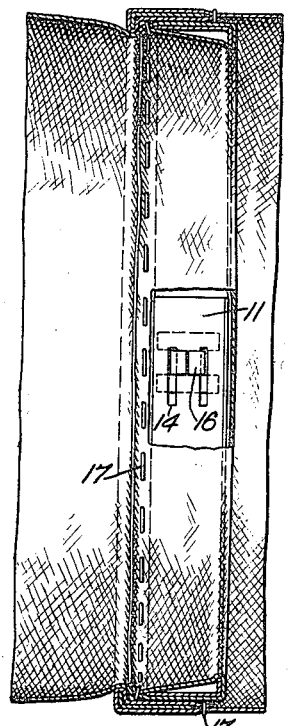
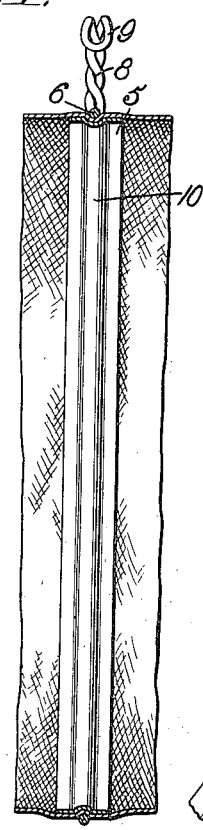
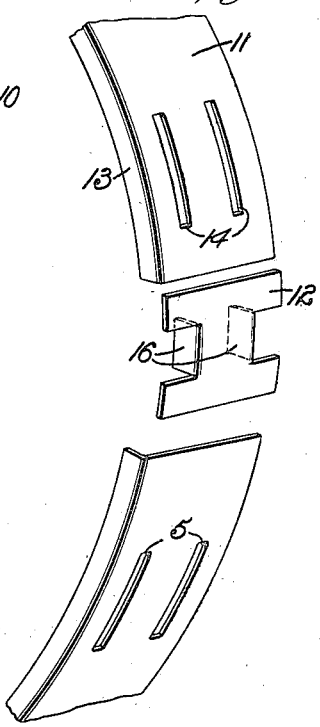
Fig. 2. Fig. 3. Fig. 4. Fig. 5.
WITNESSES
INVENTOR
N. B. Braly
BY
ATTORNEYS

UNITED STATES PATENT OFFICE.

NORMAN BLYTHE BRALY, OF BUTTE, MONTANA.

CANVAS-HOSE COUPLING.

1,211,067. Specification of Letters Patent. Patented Jan. 2, 1917.

Application filed August 8, 1916. Serial No. 113,702. REISSUED

*To all whom it may concern:*

Be it known that I, NORMAN B. BRALY, a citizen of the United States, and a resident of Butte, in the county of Silverbow and State of Montana, have invented a new and Improved Canvas-Hose Coupling, of which the following is a full, clear, and exact description.

This invention relates to hose coupling and particularly to a coupling for canvas hose used in mines, and has for an object the provision of an improved structure which is reversible and which may be quickly connected and disconnected at any time.

Another object in view is to provide a spreading ring in addition to the coupler whereby the ring and coupler will hold the hose distended, the ring being supplied with means for suspending the hose.

A still further object in view is to provide a coupling for air hose which includes in its construction slightly collapsing rings and a connecting sliding member, whereby the ring structure will always be maintained but may be increased or decreased in diameter as desired.

In the accompanying drawing:—Figure 1 is a side view of a canvas hose with an embodiment of the invention applied thereto, the various parts being shown in use. Fig. 2 is a longitudinal vertical section through the abutting ends of hose and the coupling connected thereto. Fig. 3 is a plan view of the coupling with a certain part broken away for better illustrating certain of the detail features. Fig. 4 is a sectional view through part of one of the hose sections showing a spreading and supporting ring embodying certain features of the invention. Fig. 5 is a fragmentary detail perspective view of the overlapping ends of one of the coupling rings and the fastening means therefor.

Referring to the accompanying drawing by numerals, 1 indicates the roof or top of the passageway into which suitable supporting members 2 are inserted for supporting a wire or cable 3 known as a messenger wire. The passageway, wire 3 and associated parts are in common use in mines and therefore form no part of the present invention, but the wire 3 is utilized for supporting the canvas hose 4. This hose is intended as a conduit for air which is supplied from time to time and whenever desired to any convenient point, the convenience being in the ease with which the hose may be moved and lengthened or shortened.

The hose 4 is made into a number of sections each section being connected by a coupler embodying the invention and intermediate the sections supporting and spreading means are provided embodying certain features of the invention, the same comprising an inner ring 5 and an outer wire or rod 6 held together at a suitable point by a hook and eye structure 7. The upper end of the wire is twisted at 8 and bent at 9 which hooks over the messenger wire 3 for properly supporting the canvas hose out of the way. It will be observed that the ring 5 is provided with an inwardly extending bead 10 whereby an outer peripheral groove is presented into which part of the canvas is forced, as shown in Fig. 4, by the wire 6 so that the ring is always held in proper position for spreading the canvas and also for supporting the wire 6.

The coupling as shown more particularly in Figs. 2 and 5 is formed from a metal ring 11 and a connecting plate 12. The ring 11 is provided with a turned-down flange 13 and is divided or cut at one point so that the ends may overlap, as shown in Figs. 2 and 3. The overlapped ends of the ring 11 are provided with slots 14 and also slots 15. The depending members 16 project through these slots, as shown in Fig. 2, and are bent over though arranged to loosely inclose part of the ring 11 between the slots. This will allow the ends of the ring to telescope over each other and move back and forth for varying the diameter of the ring in order that the ring on the end of one section of hose may be inserted into the other.

It will be noted that the rings are reversible or, rather, the couplings are reversible, so that either end of any section may be either inserted into the end of the next adjacent section or over the end of the next adjacent section and the parts properly interlocked. The ends of the section of canvas are passed over the rings and are stitched in place by a line of stitching 17 for each ring, the rings being arranged so that the flange 13 will be at the end. The rings 11 are made somewhat resilient so as to freely spread or become enlarged after having been contracted whereby the rings of adjacent sections will interlock and form a complete coupler amply strong to hold the sections of the hose together.

In mining operations, after the mine has been sunk a predetermined distance, air must be supplied to the workmen by some means which heretofore has usually been metallic pipes discharging at convenient points near the workmen, the foul air or gases being allowed either to ascend by reason of their nature or by reason of suction pipes properly distributed. The use of metal pipes for this purpose in temporary galleries and other temporary parts of the mine, or where new passageways are being formed, is more or less expensive and therefore undesirable. The coupling and ring embodying the invention causes the use of canvas hose to be very acceptable in places of the kind just described, as the hose may be quickly and easily arranged in position by a minimum number of workmen, as each section may be independently carried and set up. Preferably the hose is suspended by hook 9, though this is not essential, as the hose may be laid on the floor or on any suitable system of projections, as the hose will readily conform to the shape of the passageway, which is not true of metal pipes unless a large amount of work is performed thereon.

What I claim is:

1. A hose coupling comprising a coupling ring formed with an inwardly extending flange, said ring being cut or divided at one point so that the ends may overlap, and means for slidingly holding said ends in position, the ring connected with one section of hose being capable of insertion into the next adjacent section of hose.

2. In a hose coupling of the character described, the combination of a canvas hose divided into sections, a resilient metallic ring arranged at each end of each of said sections, said rings being cut at one point in order to overlap, a pair of slots in each of the overlapped portions or ends of said ring, said slots extending longitudinally of the rings, and a binding plate formed with a body fitting against the ring and with retaining extensions projecting through said slots and overlapping part of the material of the ring between the slots whereby the overlapped ends cannot become disengaged but may freely move longitudinally so as to vary the diameter of the ring.

3. A coupling for canvas hose comprising a ring divided at one point and overlapped at the divided point, said overlapped sections having each a pair of longitudinally arranged slots, and a clip having arms extending from said slots for preventing disengagement of the overlapping sections while allowing a free longitudinal movement within limits, whereby the ring on the end of one section of hose may be forced into or from the ring of the next adjacent section.

NORMAN BLYTHE BRALY.